3,392,124
PHYSICALLY STABLE ALUMINO-SILICATE
ZEOLITE CATALYSTS
Sebastian Marc Laurent, Greenwell Springs, La., assignor to Esso Research and Engineering Company, a corporation of Delaware
No Drawing. Continuation-in-part of application Ser. No. 291,299, June 28, 1963. This application Dec. 21, 1964, Ser. No. 420,135
11 Claims. (Cl. 252—459)

ABSTRACT OF THE DISCLOSURE

An improved process for preparing crystalline alumino-silicate zeolite catalyst wherein the crystalline zeolite is calcined in the presence of a water-containing atmosphere. Preferably, the calcining atmosphere is a mixture of steam and air. In general, the water will be present in an amount ranging between 1.5 to 50 wt. percent. In practice, the amount of water used is dependent upon the exact catalyst composition employed and the degree of activity desired. The catalyst prepared by the improved process exhibits improved structural stability and hence an increased catalyst life.

---

This application is a continuation-in-part of Ser. No. 291,299, filed June 28, 1963, and now abandoned in the name of Sebastian Marc Laurent.

The present invention is concerned with improvements in the preparation of crystalline alumino-silicate zeolite materials, particularly, such materials that are used as bases for, or as component of, catalysts that are employed in catalytic conversion processes. More particularly, the invention is concerned with the preparation and use of crystalline alumino-silicate zeolite materials having improved physical stability.

The crystalline zeolites differ from each other in chemical composition but they may be generally characterized as alkali metal or alkaline earth metal hydrated alumino-silicates. The crystal patterns of these zeolites are such that they present structures containing a large number of pores having an exceptional uniformity of size. The pores in different zeolites may vary in diameter from less than 4 A. to 15 A. or more but for any one crystalline zeolite the pores are essentially of uniform size.

It has recently been found that crystalline alumino-silicate zeolites having pore openings in the range of from about 6 A. to 15 A. can be employed as catalysts for various processes, particularly hydrocarbon conversion processes. The pore sizes are such that they allow for easy ingress of substantially all hydrocarbon feed types and egress of the reaction products. Because of this, catalytic coke buildup within the structure of the catalyst tends to be minimized and the catalyst is more easily regenerated.

While the crystalline alumino-silicate zeolites have proved to be quite satisfactory as catalysts or catalyst supports in various petroleum conversion processes, particularly in catalytic cracking or hydrocracking, it has been recognized that there is a need for improving the catalyst life of such materials. One important factor in such catalyst life is the structural stability of the zeolite. It has been found, in accordance with the present invention, that the structural stability of crystalline alumino-silicate zeolites can be greatly increased if a modified calcining step is employed, as will be described more fully hereinafter.

The present invention is particularly directed to the preparation of crystalline alumino-silicate zeolites having chemical formulas that may be expressed in terms of moles by the following:

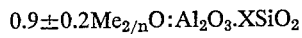

$$0.9 \pm 0.2 Me_{2/n}O : Al_2O_3 . XSiO_2$$

In the above formula, Me is selected from the group consisting of metal cations and hydrogen, $n$ is the valence of Me, and X is a number in the range of from about 2.2 to about 14. Most useful are those zeolites in which X is in the range from about 3 to about 6.5.

Crystalline alumino-silicate zeolites having pore openings in the range of from about 6 A. to about 15 A. and varying silica-to-alumina ratios may be prepared by any of the methods known in the art. The principle involved is to have present the proper amount and ratios of silica, alumina and sodium hydroxide. Alumina may be supplied in the form of sodium aluminate or an alumina sol or the like, silica may be supplied in the form of sodium silicate and/or silica gel and/or a silica sol, and alkali may be furnished by an alkaline hydroxide, as for example sodium hydroxide, either as such or in combination with sodium aluminate and/or sodium silicate. As taught in the prior art, careful control should be kept over the pH, the sodium ion concentration of the mix, and the crystallization period. Suitable processes for preparing crystalline alumino-silicate zeolites in this manner are described, for example, in U.S. Patents 2,882,244 and 2,971,904.

If the crystalline alumino-silicate zeolite is to be employed as a catalyst for catalytic cracking, and particularly for hydrocracking, it is desirable to have a major proportion, and in some cases substantially all, of the sodium removed from the crystalline alumino-silicate zeolite by a base-exchange operation. One way of doing this is to react the zeolite with hydrogen-containing cations, e.g. ammonium ions. On subsequent calcination of the ammonium form of the zeolite, the "hydrogen" form results.

Other catalysts or catalyst supports can be prepared by replacing the sodium in the original crystalline alumino-silicate zeolite by other elements such as cobalt, nickel, zinc, magnesium, calcium, cadmium, copper and barium or mixtures thereof. This is accomplished by reacting the crystalline zeolite with a salt such as magnesium sulfate, calcium chloride, barium chloride, cobalt chloride, etc. Such base-exchanged crystalline zeolites may be employed as catalysts per se or they may be used as supports for other catalysts such as the platinum group metals or platinum group metal compounds. The platinum group metals include platinum, palladium, rhodium, osmium, iridium, and the like.

As a finishing step in the preparation of a crystalline alumino-silicate zeolite either in its original form or in the form of a base-exchanged material or in the form of a crystalline alumino-silicate zeolite that has been impregnated with an additional catalytic material, such as palladium, the zeolite or zeolite catalyst is subjected to a calcining operation which may involve heating the material at a temperature of from 400° F. to about 1000° F. for several hours. For example, it may involve 2 hours' heating at 400° F. followed by 4 hours at 550° F. followed by a 16-hour treat at 850° F. Normally, this calcining is done with the aid of dry air. It has now been found, and forms the subject of the present invention, that if the calcining is conducted in the presence of added moisture, as opposed to calcining in a totally dry atmosphere, the structural stability of the crystalline alumino-silicate zeolite catalyst or crystalline alumino-silicate zeolite catalyst support is greatly increased.

The amount of moisture in the partly moist air may range from about 1.5 to about 50% by weight. The preferred water content ranges will depend upon whether or not the crystalline alumino-silicate zeolite catalyst has been impregnated with platinum group metal, e.g. palladium, since high water contents, although advantageous with regard to the structural stability of the crystalline alumino-silicate zeolite catalyst support, tend to agglomerate the highly dispersed platinum group metal which leads to reduced catalytic activity. With the platinum group metal impregnated catalysts, it will not be desired to utilize a water content of 10 wt. percent or greater due to this lowering of catalytic activity. Thus, when the crystalline alumino-silicate zeolite catalyst support contains platinum group metal, the preferred water content range will be about 1.5 to less than about 10 wt. percent, more preferably about 2 to about 5 wt. percent. When the crystalline alumino-silicate zeolite catalyst has not been impregnated with platinum group metal and there is thus no problem of metal agglomeration, the preferred water content range will be higher; i.e. about 1.5 to about 25 wt. percent, more preferably about 10 to about 20 wt. percent.

The process of the present invention and the benefits derived therefrom will be more fully appreciated by reference to the following examples.

EXAMPLE 1

A solution is prepared by dissolving 6870 grams of 97% NaOH and 1513 grams of sodium aluminate (Baker & Adams commercial grade) in 27,088 ml. of distilled water. This solution is added with stirring to a separate vessel which contains 37,590 grams of Ludox silica hydrosol (30% $SiO_2$). The mixture is stirred until homogeneous and then it is transferred to a 72-liter round-bottom flask to which are attached a reflux condenser and a thermocouple well. The mixture is heated in this flask at 176 to 204° F. until crystallization occurs (about 48 hours). The product is then filtered and washed until the wash water has a pH of 9.0. The material is then oven dried at about 250° F. Chemical analysis of the material reveals that it contains 61.2% $SiO_2$, 24.2% $Al_2O_3$ and 14.6% $Na_2O$. This corresponds to a molecular composition of approximately $1.0\ Na_2O.Al_2O_3.4.3SiO_2$. An X-ray diffraction pattern of this material is similar to that of the mineral faujasite.

EXAMPLE 2

A slurry is prepared consisting of 1 liter of water and 500 grams of the crystalline alumino-silicate zeolite prepared as described in Example 1. In a separate vessel, 200 grams of ammonium chloride is dissolved in 1500 ml. of water and 336 ml. of concentrated ammonium hydroxide (28% $NH_3$). The ammoniacal solution of ammonium chloride is added to the aqueous slurry of crystalline alumino-silicate zeolite and the composite is stirred intermittently over a 3-hour period at ambient temperatures. The liquid is then removed from the slurry by decanting and the solid material that remains is washed twice with 500 ml. portions of water. This ion-exchange step is then repeated three times using fresh solutions of ammonium hydroxide and ammonium chloride each time. The washed material that is finally obtained is dried in an oven at 220° F. The product obtained by this procedure is the ammonium form of the crystalline alumino-silicate zeolite.

EXAMPLE 3

The ammonium form of the crystalline alumino-silicate zeolite is impregnated with palladium in the following manner. A slurry is made by taking 175 grams of the product of Example 2 and adding it to 600 ml. of deionized water. To this slurry is slowly added a solution that has been made as follows: dilute 20.8 ml. of 28% ammonium hydroxide to 80 cc., heat to 130° F., add 104 ml. of palladium chloride solution containing 0.8 gram of palladium. After the solution has been added to the slurry the zeolite is filtered from the solution, washed with deionized water and dried at 300° F.

EXAMPLE 4

Crystalline alumino-silicate zeolites having a faujasite-type structure, uniform pore openings of about 13 A., and an $SiO_2/Al_2O_3$ ratio of about 4.5 were prepared in the manner of Example 1 and thereafter ion-exchanged with ammonium hydroxide-ammonium chloride solutions to produce the ammonium form of the zeolites in the manner of Example 2. A portion of the zeolites was thereafter reacted with ammoniacal palladium chloride in the manner of Example 3, dried and pilled. Three separate samples of the palladium impregnated and dried crystalline alumino-silicate zeolites, and the fourth sample which was not palladium impregnated, were then subjected to comparative calcining procedures. Another portion of the zeolites was not impregnated with palladium, but was simply dried and pilled. Each of the three batches was calcined for 16 hours at 650° F. and 2 hours at 950° F., in one case using dry air, in the second case using air containing 3.5 wt. percent of water, and in the third case using air containing 10 wt. percent of water, and in the fourth case using air containing 16 wt. percent water. The percent of crystallinity in each sample was then determined by X-ray analysis. A portion of each of the zeolites was then subjected to a stability test which consisted of exposing them to water-saturated air at room temperature for 16 hours. The crystallinity of each sample was then again measured by X-ray analysis. The results obtained are shown in Table I.

TABLE I

| Catalyst No.: | Palladium | Calcining Atmosphere [1] | Percent of Initial Crystallinity After Stability Test |
| --- | --- | --- | --- |
| 1 | Yes | Dry Air | 23 |
| 2 | Yes | Air+3.5% Water | 45 |
| 3 | Yes | Air+10% Water | 55 |
| 4 | No | Air+16% Water | 63 |

[1] In each instance for 16 hours @ 650° F. followed by 2 hours @ 950° F.

The data show that calcining with air containing small percentages of moisture in accordance with the present invention more than doubles the stability of the crystalline alumino-silicate zeolite catalyst.

The first two samples of crystalline alumino-silicate zeolites (i.e. Catalyst Nos. 1 and 2) were found to have equivalent activity for the hydrocracking of light catalytic cycle oil when tested in a hydrocracking screening test which consisted of hydrocracking the feed at a pressure of 1000 p.s.i.g., at a temperature of 600° F., and at a feed rate of 3 v./hr./v. Catalyst No. 3 was only 58% as active in this test as either No. 1 or No. 2. This lowering of activity was due to agglomeration of palladium at the higher water content as shown by the following example.

EXAMPLE 5

Catalyst No. 4 of Example 4, i.e. the crystalline zeolite catalyst which had not been impregnated with platinum group metal, was utilized as a cracking catalyst for the conversion of n-heptane. Two samples of the catalyst were calcined by the procedure of Example 4, in one case using dry air and in the second case using air containing 16 wt. percent water. Portions of the two samples were then subjected to the stability test of Example 4; i.e. exposure to water-saturated ambient air for 16 hours. The portions of the samples were then tested for cracking ability by contact with n-heptane at 700° F., a three minute cracking cycle, and a feed rate of 11 weights of n-heptane per hour per weight of catalyst. The results are indicated in the following table:

TABLE II

| | Calcining Atmosphere | Subsequent Exposure to Moist Ambient Air | Conversion of n-heptane, Vol. Percent |
|---|---|---|---|
| Catalyst No.: | | | |
| 4 | Dry Air | No | 50.15 |
| 4 | do | Yes | 5.3 |
| 4 | Air+16% Water | No | 45.9 |
| 4 | do | Yes | 50.1 |

As indicated in the above table, when the catalyst was calcined in dry air, catalytic activity (which is related to crystallinity) was substantially destroyed in the stability test. However, when the catalyst was calcined in air containing 16 wt. percent water, catalytic activity after the stability test was as good or better than before. Again, the stability of crystalline alumino-silicate zeolite catalysts is shown to be substantially increased when the calcination step is performed in presence of water. Additionally, comparison of the activity loss of Catalyst No. 3 in Example 4 with the above-indicated activity gain of Catalyst No. 4, will indicate that a higher water content in the calcining atmosphere is desirable with those zeolite catalysts which do not contain platinum group metals due to absence of the agglomeration effect discussed previously.

EXAMPLE 6

A catalyst identified as Catalyst A is prepared as follows. Dissolve 71.5 lbs. of commercial grade NaOH (97% purity) in 72.1 lbs. of water and heat to 200° F. Stir in 62.8 lbs. of C-31 alumina (a commercially available $Al_2O_3 \cdot 3H_2O$) and mix until it all dissolves; cool to room temperature. Combine this mixture with 560.6 lbs. of low-sodium Ludox silica hydrosol containing 30% $SiO_2$. Incubate this mixture at room temperature for about 1 to 15 hours, heat to 210° F. and hold at 210° F. about 3 days; filter and wash until pH of wash water reaches 9.0. This crystalline alumino-silicate zeolite is then converted to the ammonium form by the procedure of Example 2, and then to the palladium-containing form by the method of Example 3.

A crystalline alumino-silicate zeolite catalyst identified as Catalyst B is prepared in the same manner as Catalyst A except that the proportions of reagents are as follows: 244 lbs. of commercial grade NaOH (97% purity), 646 lbs. of water, 157 lbs. of C-31 alumina, and 2002 lbs. of Ludox silica hydrosol.

EXAMPLE 7

In preparing crystalline alumino-silicate zeolites in accordance with Example 6, various portions were calcined either with dry air or with air containing either 3.5 wt. percent or 7 wt. percent of water. These crystalline alumino-silicate zeolites were subjected to the stability test described in Example 4. The results obtained are given in Table III.

TABLE III

| | Calcining Atmosphere | Percent of Initial Crystallinity After Stability Test |
|---|---|---|
| Sieve Catalyst: | | |
| A | Dry Air | 35 |
| | Air+3.5% $H_2O$ | 75 |
| | Air+7.0% $H_2O$ | 90 |
| B | Dry Air | 48 |
| | Air+3.5% $H_2O$ | 62 |

The enhanced stability obtained when calcining in the presence of air containing a small percentage of moisture is again apparent.

EXAMPLE 8

The crystalline alumino-silicate zeolites of Example 7 were also subjected to a stability test involving immersion in water for a period of 30 minutes at room temperature followed by rapid redrying at 1000° F. with air containing 3.5 wt. percent water. The results obtained are shown in Table IV:

TABLE IV

| Sieve Preparation and Method of Calcining | Percent Crystallinity on Relative Scale After Treatment Indicated | | |
|---|---|---|---|
| | Heated at 1,000° F. | Immersed in $H_2O$ | Recalcined at 1,000° F., 2 Hrs. |
| A, Dry Air | 49 | 31 | 2 |
| A, Air+3.5% $H_2O$ | 80 | 59 | 62 |
| B, Dry Air | 79 | 45 | 10 |
| B, Air+3.5% $H_2O$ | 107 | 60 | 64 |

In this table, the percentage figures are not the percent of initial crystallinity but rather the percentage of crystallinity on a relative scale as compared with a standard sample of commercial crystalline alumino-silicate zeolites, which explains the existence of percentage figures exceeding 100.

EXAMPLE 9

The ammonium form of a crystalline alumino-silicate zeolite prepared as described in Example 2 is converted to the hydrogen form by the following procedure. The dried material is placed in a muffle furnace and heated at 300° F. for 16 hours and subsequently at 650° F. for 16 hours. During this calcining step the air that is passed through the muffle furnace contains about 3.5 wt. percent of water. The temperature is finally brought to 950° F. and held there for an additional 2 hours, again using air containing 3.5 wt. percent of water. The calcined material that is finally obtained comprises the anhydride of the hydrogen form of the crystalline alumino-silicate zeolite. A chemical analysis of the product shows 2.2% $Na_2O$, 70.6% $SiO_2$, and 27.2% $Al_2O_3$, which corresponds to a molecular composition of about 0.13 $Na_2O \cdot Al_2O_3 \cdot 4.4SiO_2$.

EXAMPLE 10

The hydrogen form of a crystalline alumino-silicate zeolite prepared as described in Example 9 was subjected to X-ray analysis to determine percent of crystallinity. The crystalline alumino-silicate zeolite was then subjected to the stability test described in Example 4, i.e. the zeolite was exposed to water-saturated air at room temperature for 16 hours and its crystallinity was again measured. The crystallinity was 68% of that of the sample before the test. Thereafter the thus treated sample of crystalline alumino-silicate zeolite was impregnated with palladium in the manner of Example 3 and then dried and pilled, after which it was calcined for 16 hours at 650° F. and 2 hours at 950° F. in the presence of air containing 3.5 wt. percent of water. The calcined product was exposed to water-saturated air at room temperature and its crystallinity measured by X-ray analysis. The crystallinity was found to be 66% of that of the original hydrogen form of the zeolite, i.e. the sample prior to the first test mentioned above.

It will be seen from some of the foregoing examples that in the preparation of a crystalline alumino-silicate zeolite catalyst containing a platinum group metal or compound thereof in accordance with the present invention there may be more than one calcination step, i.e. there may first be a calcination to convert the ammonium form of the crystalline alumino-silicate zeolite to the hydrogen form before impregnation with palladium or the like followed by a second calcination, or the noncalcined ammonium form may be impregnated directly and then calcined, using air or equivalent gas of controlled moisture content as taught herein. Where the hydrogen form of crystalline alumino-silicate zeolite is impregnated with palladium or related metal or metal compound and then calcined, i.e. where calcination has already been effected in the presence of air or equivalent gas of controlled moisture content in preparing the hydrogen form of the crystalline alumino-silicate zeolite, the second calcination may be performed with dry air or equivalent gas. It is preferred, however, that the latter calcination also be done with gas of controlled moisture content as defined in the foregoing disclosure.

Calcination temperatures in the range of about 350° F. to 1200° F. may be employed in the present invention, the preferred temperature range being about 650° to 1000° F. The optimum calcination temperature will depend somewhat on the basicity of the crystalline alumino-silicate zeolite as well as the silica-to-alumina ratio. In general, higher silica contents permit higher calcination temperatures. A minimum of 3 to 4 hours of calcination is usually necessary for proper calcination. Heating to the ultimate calcination temperature generally must be done on a gradual or stepwise basis to prevent degradation of the physical structure of the crystalline alumino-silicate zeolite.

Because of ready availability and low cost, air is ordinarily the gas that is employed in the calcination step of the present invention. Other non-reducing gases could be employed, however, particularly inert gases such as nitrogen and helium, for example. For the platinum group metal-containing catalysts, while the water content of the calcining gas may range from about 1.5 to less than about 10 wt. percent, more usually concentration ranges of 2 to 5 wt. percent will be employed.

While the specific examples have been concerned with the preparation of crystalline alumino-silicate zeolites that have been converted to the hydrogen form, the invention is also applicable to other crystalline alumino-silicate zeolites including those where the sodium cation that is regularly present is replaced by other cations. Thus, a large pore sodium zeolite can be base-exchanged with calcium chloride to convert it to the calcium form and the latter can be composited with a palladium salt and reduced to give a hydrocracking catalyst, the calcining step being conducted in accordance with the present invention. Other cracking and hydrocracking catalysts can be prepared by base-exchanging the sodium form of the crystalline alumino-silicate zeolite with magnesium or calcium compounds either alone or in addition to hydrogen ion-exchange, again employing the calcining step of the present invention to prepare catalysts of outstanding stability.

Also, while the specific examples have been directed to the calcination of synthetic crystalline alumino-silicate zeolites, the invention is also applicable to certan naturally occurring zeolites, such as faujasite or mordenite and to modifications of such naturally occurring zeolites.

It is to be understood that although that portion of the present invention which concerns the preparation of hydrocarbon conversion catalysts has been particularly directed to hydrocracking catalysts wherein an active component is a platinum group metal such as platinum or palladium, the invention is also applicable to the preparation of other catalysts wherein the crystalline alumino-silicate zeolite is associated with such metals and/or compounds thereof as cobalt, iron, nickel, copper, silver, gold, molybdenum, tungsten, vanadium, zirconium, calcium, magnesium, cadmium, zinc, rare earths, mercury, and lead.

The scope of the invention is to be determined by the appended claims and not solely by the foregoing examples.

What is claimed is:
1. A process for improving the physical properties of a crystalline alumino-silicate zeolite composited with a platinum group metal comprising the steps of calcining said composited zeolite at a temperature in the range of 350° to 1200° F. in the presence of a gas containing from about 1.5 to less than 10 wt. percent water, said gas being selected from the group consisting of inert gases and air.

2. The process of claim 1, wherein said gas contains about 2 to about 5 wt. percent water.

3. The process of claim 1, wherein said platinum group metal is palladium.

4. The process of claim 1, wherein said calcination step is performed prior to composition with said platinum group metal.

5. The process of claim 1, wherein said calcination step is performed subsequent to composition with said platinum group metal.

6. An improved process for preparing a hydrocarbon conversion catalyst which consists essentially of the steps of compositing an ammonium ion-containing crystalline alumino-silicate zeolite, said zeolite having uniform pore openings of about 6 A. to 15 A. and a silica-to-alumina mole ratio of about 3 to 6.5, with a thermally decomposable compound of a platinum group metal and thereafter subjecting the composited zeolite to a calcination treatment at a temperature in the range of 350° F. to 1200° F. in the presence of air containing from about 1.5 to less than about 10.0% of water by weight.

7. The process of claim 6, wherein the air contains about 2 to about 5 wt. percent water.

8. The process of claim 6, wherein said thermally decomposable compound comprises palladium chloride.

9. An improved process for preparing a hydrocarbon conversion catalyst which consists essentially of the steps of calcining an ammonium form of a crystalline aluminosilicate zeolite having uniform pore openings of about 6 A. to 15 A. at a temperature in the range of 350° F. to 1200° F. in the presence of air containing in the range of about 1.5 to 25 wt. percent of water, thereby converting the said zeolite to the corresponding hydrogen form, compositing the resulting hydrogen form with a thermally decomposable compound of a platinum group metal and calcining the composited zeolite in the presence of air containing in the range of about 1.5 to less than about 10 wt. percent water.

10. The process of claim 9, wherein said thermally decomposable compound comprises a compound of palladium.

11. The proces of claim 9, wherein said temperature is in the range of about 650° to 1000° F.

References Cited
UNITED STATES PATENTS

| | | | |
|---|---|---|---|
| 2,971,904 | 2/1961 | Gladrow et al. | 208—135 |
| 3,140,249 | 7/1964 | Plank et al. | 252—455 X |
| 3,210,265 | 10/1965 | Garwood | 208—111 |
| 3,236,761 | 2/1966 | Rabo et al. | 208—111 |

OTHER REFERENCES

"Chemical Engineers' Handbook," 2nd edition, 1941, John H. Perry, Ph. D., editor, p. 1515.

DANIEL E. WYMAN, *Primary Examiner.*

C. F. DEES, *Assistant Examiner.*